(12) United States Patent
Thor

(10) Patent No.: US 11,648,532 B2
(45) Date of Patent: May 16, 2023

(54) ABSORBENT AND METHOD OF MAKING AND USE OF THE SAME

(71) Applicant: Jason Thor, Las Vegas, NV (US)

(72) Inventor: Jason Thor, Las Vegas, NV (US)

( * ) Notice: Subject to any disclaimer, the term of this patent is extended or adjusted under 35 U.S.C. 154(b) by 483 days.

(21) Appl. No.: 16/717,612

(22) Filed: Dec. 17, 2019

(65) Prior Publication Data

US 2020/0188877 A1     Jun. 18, 2020

Related U.S. Application Data

(60) Provisional application No. 62/780,774, filed on Dec. 17, 2018.

(51) Int. Cl.

| | | |
|---|---|---|
| *B01J 20/26* | (2006.01) | |
| *B01J 20/22* | (2006.01) | |
| *B01J 20/28* | (2006.01) | |
| *B01J 20/32* | (2006.01) | |
| *C02F 1/28* | (2023.01) | |
| *B01D 53/02* | (2006.01) | |
| *B01J 20/30* | (2006.01) | |

(52) U.S. Cl.
CPC ............ *B01J 20/267* (2013.01); *B01D 53/02* (2013.01); *B01J 20/22* (2013.01); *B01J 20/28038* (2013.01); *B01J 20/28052* (2013.01); *B01J 20/3021* (2013.01); *B01J 20/3246* (2013.01); *C02F 1/288* (2013.01); *B01D 2253/202* (2013.01); *B01D 2253/25* (2013.01); *C02F 1/285* (2013.01)

(58) Field of Classification Search
CPC . B01J 20/26; B01J 20/267; B01J 20/22; B01J 20/28038; B01J 20/28052; B01J 20/3021; B01J 20/3246; B01D 53/02; B01D 2253/202; B01D 2253/25; C02F 1/288; C02F 1/285
USPC ........................................................ 502/402
See application file for complete search history.

(56) References Cited

U.S. PATENT DOCUMENTS

| | | |
|---|---|---|
| 2011/0132387 A1 | 6/2011 | Alwattari et al. |
| 2014/0257221 A1 | 9/2014 | Kettlewell et al. |
| 2017/0274114 A1 | 9/2017 | Song et al. |

OTHER PUBLICATIONS

Written Opinion and International Search Report in Application No. PCT/US2019/066886, 45 pages, dated Apr. 22, 2020.
'Porous', Thesarurus.com, Retrieved from <https://www.thesaurus.com/browse/porous> on Feb. 13, 2020; p. 1.
'Diazolidinyl urea', Wikipedia, Retrieved from <https://en.wikipedia.org/wiki/Diazonlidinyl_urea> on Feb. 13, 2020; pp. 3.
'Carbopol Aqua 30 polymer', Lubrizol.com, Retrieved from <https://www.lubrizol.com/Home-Care/Product-Finder/Products-Data/Carbopol-Aqua-30-polyme on Feb. 14, 2020; pp. 2.
'Acetaldehyde', Wikipedia, 2013, Retrieved from <https://en.wikipedia.org/wiki/Acetaldehyde> on Feb. 14, 2020; p. 9 para 3, p. 3 table.
'List of water-miscible solvents', Wkipedia, 2009, table 1, retrieved from the Internet from <https://en.wikipedia.org/wiki/List_of_water-miscible_solvents> on Feb. 14, 2020.

*Primary Examiner* — Edward M Johnson
(74) *Attorney, Agent, or Firm* — Dinsmore & Shohl LLP

(57) ABSTRACT

An absorbent compound and method of making the same, where the absorbent compound includes an amine oxide that comprises about 30% to about 55% of the absorbent compound and a polymer that comprises about 30% to about 55% of the absorbent compound.

8 Claims, 4 Drawing Sheets

ABSORBENT AND METHOD OF MAKING AND USE OF THE SAME

BACKGROUND

A number of organic materials may contaminate water sources. These may be in the environment or in a commercial facility. The adsorption and absorption of organics has been a problem for over a century, and there are numerous instances of chemical contamination of groundwater throughout the United States. For example, the fracking industry is known to pollute groundwater in approximately 30 states. These contaminants may be very costly for companies to mitigate; for example some companies have costs ranging from over 1 million to over 1 billion dollars a year in waste mitigation cost.

Absorbents are used to recover liquids by retaining liquid and/or gases distributed throughout its molecular structure, which may result in the solid absorbent to swell. Conventionally, there are numerous types of absorbents, including natural organic absorbents (e.g. peat moss, straw, hay, sawdust, feathers, etc.) and synthetic absorbents (e.g. various plastics designed to adsorb liquids onto their surfaces). Each of these conventional absorbents has disadvantages and limitations, and the art is always looking to improve the functionality of absorbents. Furthermore, various qualities may be examined when valuating absorbents, including but not limited to: a rate of absorption, a retention quantity, and the ease of application.

Furthermore, it has conventionally been very difficult and expensive to absorb organics or water soluble solvents from water. Organic compounds dissolve into water because the affinity of their polar functional groups for water is stronger than the repulsion of their non-polar groups from water. It is also known that increasingly longer carbon chain molecules are increasingly more insoluble in water. Solvents contain (hydrophilic) polar functional groups, that when mixed with water become oriented so that the solvent(s) in water will have a stronger capability for combining with water, this combination then becomes an organic contaminant. For example, hydrocarbons, like benzene, xylene, and toluene with water are considered aromatic hydrocarbons, that are strongly hydrophobic yet have strong polar sites may be held at both the surface and slightly mix with the surface of the body of water. Semi-polar compounds, such as alcohols (e.g. acetone, and isopropanol) are miscible in water. Alcohol is soluble in water, as the hydroxyl group in the alcohol forms hydrogen bonds with water molecules. Additionally, alcohols that have a smaller hydrocarbon chain are more soluble in water. Generally, as the length of the hydrocarbon chain increases, the solubility in water decreases.

Polar portions can consist of a hydrophilic chemical group or combinations thereof. Examples of suitable groups include, but are not limited to, alcohols, glycerides, sterols, esters, ethers, aldehydes, ketones, carboxylates, sulfates, and sulfonates. The follow is a ranking of polarity of various function groups (most polar to least polar): amide, acid, alcohol, ketone, aldehyde, amine, ester, ether, and alkane. Alcohol is ranked third in terms of polarity due to its hydrogen bonding capabilities and presence of one oxygen atom in an alcohol molecule.

Acetone is another example of a water soluble solvent. Acetone occurs naturally in the environment in plants, trees, volcanic gasses, and is a product of human body fat. However, the majority of acetone released in to the air or water is a result of industrial uses. Acetone and isopropanol are two of the most water-soluble solvents in the world. Conventionally, removing these solvents from water may be only be achieved through distillation. However, even distillation will not remove all acetone from water.

An improved process and efficiency for absorbing these is desired. Numerous industries have a need for such improvement including, but not limited to, municipalities, militaries, environmental agencies, pharmaceutical companies, desalination plants, nuclear plants, ethanol plants, chemical plants, wastewater facilities, cooling towers, metalizing industries, and more.

SUMMARY

The present application provides one or more of the features recited in the appended claims and/or the following features which alone or in any combination, may comprise patentable subject matter.

In an aspect, the present embodiments relate to an absorbent compound including: an amine oxide comprising about 30% to about 55% of the absorbent compound; and a polymer comprising about 30% and about 55% of the absorbent compound.

In some embodiments, the amine oxide comprises about 50% to about 52% of the absorbent compound and the polymer comprises about 48% and about 50% of the absorbent compound.

In some embodiments, the absorbent compound may additionally include a preservative that is about 0.01% to about 1.0% of the absorbent compound. In some embodiments, this preservative is urea; in other embodiments, the preservative is isothiazolinone, Kathon™, or any other suitable preservative.

In some embodiments, the amine oxide is lauramine oxide and the polymer is lightly cross-linked alkali-swellable acrylic emulsion polymer.

In some embodiments, the absorbent compound is placed in a filter, on a film, or incorporated as part of a housing for a filter.

In some embodiments, the absorbent compound is configured to absorb a water soluble solvent from water. In other embodiments, the absorbent compound is configured to absorb a contaminant from a gas or atmospheric air.

In another aspect, the present embodiments relate to a method of applying an absorbent compound, the method including: rinsing a film with a quantity of distilled water sufficient to clean the film; spraying an amine oxide onto the film, where the amine oxide is about 50% to about 52% of the absorbent compound; simultaneously uniformly spraying a polymer onto the film, where the polymer is about 48% to about 50% of the absorbent compound; rinsing the film with distilled water; and drying the film at about 70 degrees Fahrenheit to about 100 degrees for at least one minute.

In some embodiments, the method additionally include spraying, simultaneously as the amine oxide and the polymer, spraying a preservative onto the film, where the preservative comprises about 0.01% to about 1.0% of the absorbent compound. In some such embodiments, the preservative is urea.

In some embodiments, the amine oxide is lauramine oxide and the polymer is lightly cross-linked alkali-swellable acrylic emulsion polymer.

In yet another aspect, the present embodiments relate to a method of applying an absorbent compound including: blending an amine oxide this is about 50% to about 52% of the absorbent compound with a polymer comprising about 48% to about 50% of the absorbent compound for about five seconds to about five minutes resulting in a blended mixture;

rinsing a film with a quantity of distilled water sufficient to clean the film; applying the blended mixture to the film; and drying (via air drying) the blended mixture on the film for at least three days at 72 degrees Fahrenheit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF FIGURES

FIG. 3A illustrates the effect of the absorbent of Example 1 on pH; FIG. 3B illustrates the effect of the absorbent of Example 1 on conductivity; FIG. 3C illustrates the effect of the absorbent of Example 1 on aluminum;

FIG. 3D illustrates the effect of the absorbent of Example 1 on manganese; and, FIG. 3E illustrates the effect of the absorbent of Example 1 on iron.

DETAILED DESCRIPTION

Figure 1:
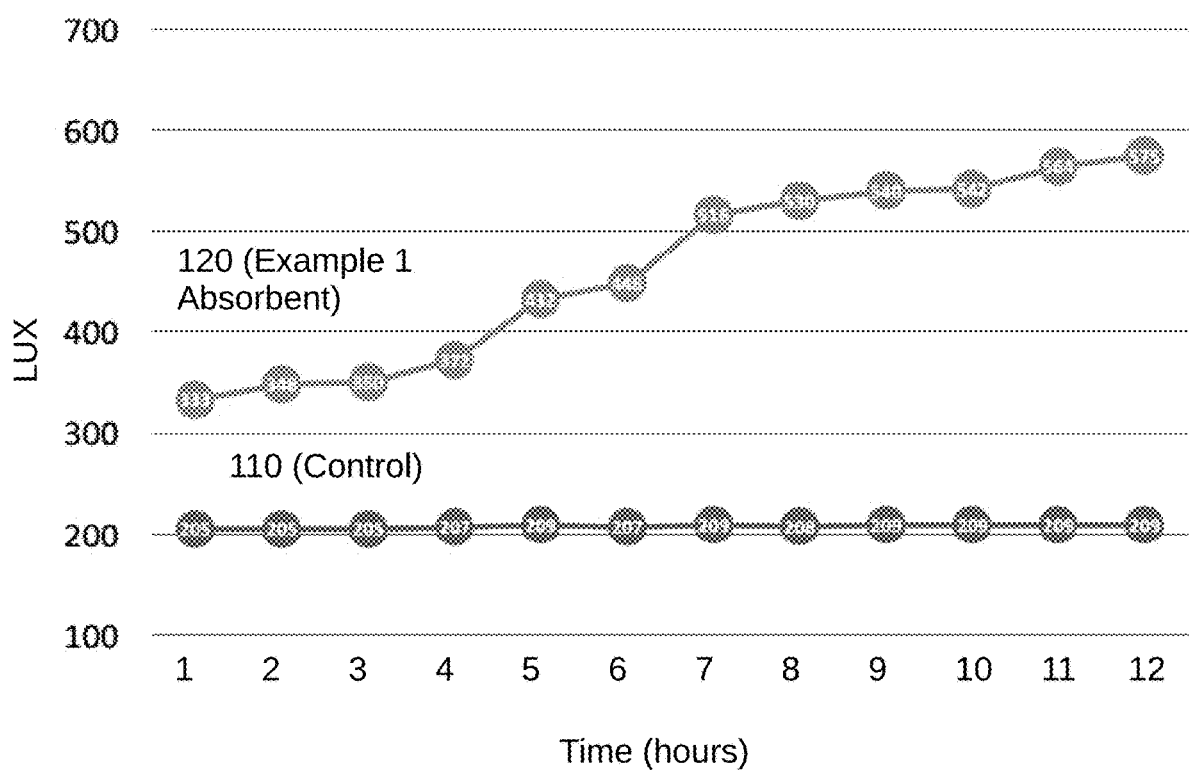
FIG. 1 is a graph illustrating the effect of the absorbent of Example 1 on RIT dye as described in Example 2.

Numerous variations and modifications will be apparent to one of ordinary skill in the art, as will become apparent from the description below. Therefore, the invention is not limited to the specific implementations discussed herein.

The embodiments discussed herein will focus on an absorbent compound, a method of making the same, and the uses thereof. In a first embodiment, the absorbent compound may include about 30% to about 55% by weight of a polymer and 30% to about 55% by weight of an amine oxide. In some embodiments, the compound may additionally include a preservative at about 0.01% to about 1.0% by weight. If required, water is added to make the remaining percentage of the combination; in some instances, this water may be added though rinsing the compound. In some embodiments, the raw polymer may be in a solid form and water may be used to generate the polymer used herein. In some instances, formaldehyde may also be incorporated into the compound.

In some embodiments, the compound may be about 50.625% of a lauramine oxide (e.g. Barlox™ 12) by weight and about 49.375% of a lightly cross-linked alkali-swellable acrylic emulsion polymer (e.g. Carbopol® Aqua 30) by weight. As a non-limiting example, the absorbent compound of the first embodiment may be prepared through combining 8.1 grams of Barlox™ 12 and 7.9 grams of Carbopol® Aqua 30. The resulting compound may have a pH of 6.4.

In another embodiment, the absorbent compound may include about 51.923% of a lauramine oxide (e.g. Barlox™ 12) and about 48.077% of a lightly cross-linked alkali-swellable acrylic emulsion polymer (e.g. Carbopol® Aqua 30). As a non-limiting example, the absorbent compound of the first embodiment may be prepared through combining 8.1 grams of Barlox™ 12 and 7.5 grams of Carbopol® Aqua 30, and the water removed during the combination of may have a pH of 7.

The preservative may include urea $(CO(NH_2)_2)$, Cason, Kathon™, isothiazolinone, or any other preserving substance at about 0.01% to about 1.00% by weight.

In yet another embodiment, the absorbent compound may include between about 50% to about 52% of an amine oxide and between about 48% and about 50% of a polymer. There are numerous amine oxides that may be utilized in the formation of the absorbent compound; for example, a non-exhaustive list of possible amine oxides is provided in Table 1 below. There may also be over twenty different polymers (both in liquid and/or powder form) that may be included in the absorbent composition. Non-limiting examples of polymers suitable for use as a coating or as a mixture with amine oxide to provide a thin-film on a substrate includes, polyethylene, polypropylene, and ethylene-acrylate copolymer. Any combination comprising an amine oxide and a polymer may be absorbent if prepared as described herein (e.g. by spray application, roll-to-roll manufacturing, dipped and roll-to-roll manufacturing, or blending). In other embodiments, the combination (powder or liquid) comprising an amine oxide and a polymer may be absorbent if prepared using two separate non-woven fabrics, each dipped into a raw ingredient (e.g. the polymer and the amine oxide) and placed on top of one another (see Example 6).

TABLE 1

| Name | Supplier | Base | % Active |
|---|---|---|---|
| Aminoxid WS 35 | Evonik | Cocoamidopropylamine | 35 |
| Ammonyx CDO Special | Stepan | Cocoamidopropyl amine oxide | 30 |
| Ammonyx DO | Stepan | Decyl dimethyl amine Oxide | 30 |
| Ammonyx LMDO | Stepan | Lauramidopropylamine oxide | 33 |
| Ammonyx LO | Stepan | lauryldimethyl amine oxide | 30 |
| Ammonyx LO Spec | Stepan | cetyl betaine | 30 |
| Ammonyx MCO | Stepan | myristyl/cetyl dimethyl ao | 30 |
| Ammonyx MO | Stepan | myristyl dimethyl ao | 30 |
| Aromox APA-T | Akzo | Tallowamidopropyl dm ao | 50 |
| Aromox C/12 | Akzo | Bis(2-hydroxyethyl) cocoamine oxide | 50 |
| Aromox DMC | Akzo | Dimethyl coco ao | 40 |
| Aromox DMHT | Akzo | Dimethyl (hydrogenated tallow) ao | 40 |
| Aromox T/12 | Akzo | Bis(2-hydroxyethyl) tallow ao | 50 |
| Barlox 10S | Lonza | Decyl ao | 30 |
| Barlox 12 | Lonza | Lauryl (C12, 14 16 blend) dm ao | 30 |

TABLE 1-continued

| Name | Supplier | Base | % Active |
|---|---|---|---|
| Barlox 14 | Lonza | Myristyl dm ao | 30 |
| Burcoxide LO | Burco | Lauryl dm ao | 30 |
| Caloxamine CPO | Pilot | Cocoamidopropyl ao | 30 |
| Caloxamine LO | Pilot | Lauryl dm ao | 30 |
| Chemoxide CAW | Lubrizol | Cocamidopropyl ao | 30 |
| Chemoxide LM-30 | Lubrizol | Lauramine o | 30 |
| Chemoxide LO | Lubrizol | Lauramine o | 30 |
| Chemoxide MO | Lubrizol | Myristamine o | 30 |
| Colalux C8 | Colonial | Octyl DM AO | 40 |
| Colalux C10 | Colonial | Decyl DM AO | 30 |
| Colalux CAO-35 | Colonial | Cocamidoproply AO | 35 |
| Colalux LO | Colonial | Lauryl AO | 40 |
| Colalux MC) | Colonial | Alkyl DMAO | 30 |
| Colalux MO | Colonial | Myristyl DMAO | 30 |
| Colalux SO | Colonial | Stearyl DMAO | 25 |
| CustoAmine LO | Custom Ingredients | Lauramine O | 30 |
| Dehyton CAW | Cognis | Cocamidopropyl AO | 30 |
| DeMox CSG-30 ECO | DeForest | Modified AO | 30 |
| DeMox LAO | DeForest | Lauryl DM AO | 30 |
| Emcol L | Chemtura | Lauramine O? | 25 |
| Emcol M | Chemtura | Myristyl DMAO? | 25 |
| Foamox CDO | Alzo Int'l | CAPO | 35 |
| Foamox DML | Alzo Int'l | Lauryl AO | 30 |
| Foamox DMM | Alzo Int'l | Myristylamine O | 30 |
| Foamox DMS | Alzo Int'l | Stearyl amine oxide | 25 |
| Hartofoam SAO | Hart Chem | Stearyl amine oxide | 24 |
| I-Oxide CAO | Hart Chem | CAPO | 35 |
| I-Oxide LO | Hart Chem | Lauryl AO | 30 |
| Incromine Oxide C | Croda | Coca APO | 30 |
| Incromine Oxide L | Croda | Lauramine O | 30 |
| Incromine Oxide M | Croda | Myristyl AO | 30 |
| Lipowax DAT | Lipo | Ceteryl alcohol and ceteareth-20 (AO) | Solid or flake |
| Lipowax PB Pastilles | Lipo | Ceteryl and polysorbate 60 (AO) | Pastilles |
| Mackamine C8 | McIntire Group | Octyl AO | 40 |
| Mackamine C10 | McIntire Group | Decyl AO | 30 |
| Mackamine C14 | McIntire Group | Myrist AO | 30 |
| Mackamine CAO | McIntire Group | CAPAO | 33 |
| Mackamine CO | McIntire Group | Cocamine O | 30 |
| Mackamine LO | McIntire Group | LaurylDMAO | 30 |
| Mackamine O2 | McIntire Group | Oleylamine oxide | 32 |
| Mackamine SO | McIntire Group | Stearamine O | 25 |
| Monalac MO | Croda | Milk lipid amidorpropyl AO | 30 |
| Norfox LDA | Norfox | Lauryl AO | 29-31 |
| Octosol 846 | Tiarco | Myristamine O | 30 |
| Rhodamox LO | Rhodia | Lauryl DMAO | 30 |
| Schercamox DML | Lubrizol | DM Lauryl AO | 30 |
| Standamox CAW | Cognis Canada | Cocamidopropyl AO | 30 |
| Stanfax 571 | Para-Chem Standard Div. | Layryl AO | 30 |
| Stanfax MO | Para-Chem Standard Div. | Myristyl AO | 30 |
| Tomamine AO 14-2 | Air Products | Lo Foam | 50 |
| Tomamine AO 405 | Air Products | Synthetic, lo foam | 50 |
| Tomamine AO 455 | Air Products | Syn, ultra lo foam | 50 |
| TomamineAO 728 Special | Air Products | Syn, Hi foam | 50 |
| Triaminox CDO | Tri-Tex co | Cocamidopropyl ao | 35 |
| Triaminox LO | Tri-Tex co | Lauryl DMAO | 30 |

In some embodiments, the absorbent compound may be utilized to remove contaminants at an oil terminal or a facility for storage of liquid petroleum products or petrochemicals or a tank farm. In such embodiments, lauramine oxide (e.g. Barlox™ 12) and lightly cross-linked alkali-swellable acrylic emulsion polymer (e.g. Carbopol® Aqua 30) may be simultaneously dispersed into a contaminated tank; when dispersed into the tank, the two compounds may simultaneously absorb contaminants in water within approximately one second. For example, in a one gallon solution of water and gel ink the lauramine oxide (e.g. Barlox™ 12) and lightly cross-linked alkali-swellable acrylic emulsion polymer (e.g. Carbopol® Aqua 30) components were able to remove the ink contaminant from the water source in approximately one second. However, it is to be understood that other contaminants may require longer for absorption, and other contaminants may require stirring in tanks to facilitate the absorption process.

In other embodiments, the absorbent compound may be dried as a solid and blended into a powder or granular form. This powder or granule may then be applied to a desired location in order to adsorb and absorb the contaminant. In still other embodiments, the absorbent compound may be molded into any number of shapes or forms as desired to meet the particular needs of the decontamination project for which the absorbent compound is going to be used. The thickness of the compound may have a role in absorption; for example, manufacturing the product at about 1 mm thick or less may result in a faster absorption rate. In some instances, particularly where a substrate or film is not utilized, the absorbent compound be may formed as an adhesive gel. Once rinsed, if rinsed, the adhesive may be removed.

In other embodiments, the absorbent compound may be prepared for use and applied to a target via spray application. For example, a plastic film, freezer paper, release liner, or any other substrate may be thoroughly rinsed with distilled water. In some instances, this plastic film, freezer paper, release liner, or any other substrate may then be placed on a conveyor belt to facilitate processing; in other instances, the plastic film, freezer paper, release liner, or other substrate may be processed in place. It is to be understood that when used herein the term "film" is used to refer generally to any substrate described above that may be used. A lauramine oxide (e.g. Barlox™ 12) may be sprayed on to the film, and as the lauramine oxide is sprayed onto the film a lightly cross-linked alkali-swellable acrylic emulsion polymer (e.g. Carbopol® Aqua 30 may also be sprayed onto the film by an arc sprayer in order to ensure a uniform thickness. If utilized, a preservative (e.g. urea, cason, Kathon™, isothiazolinone, or any other suitable preservative) may be combined with the lightly cross-linked alkali-swellable acrylic emulsion polymer and sprayed with it. In some instances, the sprayed absorbent compound may be air dried at about 70 to about 100 degrees Fahrenheit for one minute or less, where the sprayed absorbent compound may dry to form a gel on the surface of the film. In such instances, where the absorbent compound remains a gel an additional piece of plastic, freezer paper, or the like may be placed on top of the absorbent compound in order to protect the absorbent compound during packaging, storage, shipping, and the like. In other instances, the sprayed absorbent compound may be air dried at about 70 to about 100 degrees Fahrenheit for more than one minute, where the sprayed absorbent compound may dry to form a solid. The drying time may vary based on the drying temperature, as well as the thickness of the resulting absorbent. As a non-limiting example, where the resulting absorbent is paper-thin and on a release liner or film it may dry in less than one hour at room temperature (e.g. about 72 degrees); however, where the resulting absorbent is, for example, 5 mm thick, may require three days to dry at room temperature (e.g. about 72 degrees). Regardless of the form the product may take (e.g. liquid, powder, granule, gel, solid), the absorbent compound may be packaged in an air tight package, in order to prevent the absorbent compound from collecting contaminants from the air.

In other embodiments, the absorbent compound may be placed onto any type of substrate, non-limiting examples may include a thin-film such as steel, glass, plastic, paper, ceramic screens, silicone release liners, membranes, fabric (woven, non-woven, etc.), oil pads, films, freezer paper, filters, or the like (collectively referred to herein as the "film"). In such embodiments, all surfaces that may come into contact with the absorbent compound may be rinsed with distilled water. The process may begin with the lauramine oxide (e.g. Barlox™ 12) and lightly cross-linked alkali-swellable acrylic emulsion polymer (e.g. Carbopol® Aqua 30) being simultaneously blended. This blending, may be, for example, with a silicone table top blender on a ceramic surface or on a water-resistant chemical-resistant high pressure laminate (when dealing with acid polymers). If utilized, a preservative (e.g. urea, cason, Kathon™, isothiazolinone, or any other suitable preservative) may also be simultaneously blending with the lauramine oxide (e.g. Barlox™ 12) and lightly cross-linked alkali-swellable acrylic emulsion polymer (e.g. Carbopol® Aqua 30). The lauramine oxide (e.g. Barlox™ 12), lightly cross-linked alkali-swellable acrylic emulsion polymer (e.g. Carbopol® Aqua 30), and other additives if present (e.g. preservatives, polymers, and/or amine oxides) may be blended for about five seconds to about five minutes. In some instances, after about 10 seconds of blending about 70% of the water in each component (e.g. Barlox 12 and Carbopol Aqua 30) may be removed from the absorbent compound. The plastic film, freezer paper, release liner, or the like may then be rinsed with distilled water, before the absorbent compound is moved to it. A second piece of plastic film, freezer paper, release liner, or the like may be placed over the absorbent compound to serve as a cover. A roller (e.g. a rubber roller) may then be used to roll over the absorbent compound to preferred thickness. In some embodiments, the thinner the absorbent, the faster the absorbent may absorb; this is why, in some instances, it is necessary to manufacture the absorbent onto a film or other substrate. Once the absorbent compound has been rolled to the desired thickness the absorbent compound is dried. In order to form a product with a gel consistency, the absorbent compound may be air dried for about three days at about 70 to about 100 degrees Fahrenheit. In order to form a solid product, the absorbent compound may be air dried for about seven days at about 72 degrees Fahrenheit. In some instances, it may be desirable to dry the absorbent compound faster; in such instances, an absorbent compound may be fan dried for approximately one hour into a thin-film. As a non-limiting example, the absorbent compound may be dried in about 1 to about 10 seconds at 94 degrees Fahrenheit in a drying tunnel. After drying, the absorbent compound (regardless of whether it is a gel or a solid) may be packaged in an airtight package, in order to prevent the absorbent compound from absorbing contaminants from the air.

The absorbent described herein may be shapeable into a thin film that may safely and quickly adsorb and absorb organic liquids and organic powdered dyes out of wet environments. The absorbent, when shaped into a thin film, may provide a surface area for filtering the contaminated substance (e.g. water), and also provides the opportunity for a substantial majority, if not all, of the molecules to come into the absorbent and for the absorbent to absorb the contaminants. Organic contaminants that have a combination of hydrophilic and hydrophobic areas of their molecular structure, may be held at the surface of the absorbent because they are drawn to a more natural compound, which draws the organics out of water. The absorbent described herein may require only a single-step application to effectively separates solvents from water without distillation, biodegradation or any other time consuming and expensive procedures. The absorbent described herein may also adsorb and absorb multiple organics at one time, and may removes organics in low concentrations (e.g. where membranes or other filter devices cannot remove such low concentrations of aqueous solvent from water).

The absorbent described herein may be used in a variety of methods. For example, the absorbent described herein may be placed in a vessel (e.g. a 55-gallon drum) to adsorb and absorb organic contaminants. As another example, the absorbent describe herein may be placed into an activated carbon filter (or used with granulated activated carbon), or other filtration devices our available, such that when contaminated water is run over the filter it will adsorb and absorb the organic contaminants. Other solvent filters that the absorbent described herein may be used with include, but are not-limited to, polytetrafluoroethylene (PTFE) filters, GH Polypro (GHP) membrane filters, nylon filters, polyethersulfone (PES) filters, Supor® PES (Thomas Scientific, Swedesboro, N.J.), titanium, polypropylene, glass, polyvinylidene difluoride (PVDF) filter. These filter applications can be used for solvents, organic solvents, aqueous solvents, chromatography, and proteins. The absorbent(s) described herein may also be used as part of a multimedia filter, which may include, but is not limited to, layers of number one anthracite coal, silica sand, fine garnet, and support gravel. The absorbent compound may also be incorporated into the housing of a filter (e.g. a stainless steel or glass filter housing).

The polymer and amine oxide combination within the scope of the teachings herein provide improved adsorption and absorption of organics, solvents, dyes, inks, bacteria, and metal ions from water, and the synergistic effect of these is shown in the following examples.

An advantage of the absorbent described herein is that it may be used with existing water treatment systems where the capability of the system to remove organic contaminants is dramatically increased at the cost of only adding the additional chemistry. Carbon bed filters are often used downstream to remove additional organic contaminants. Use of the absorbent described herein may adsorbs and absorbs water soluble polar groups, remove substantially all color, solvents, bacteria and turbidity. The absorbent described herein may be used as the final filtering process in municipalities or wastewater treatment, by using the absorber on a screen, membrane, sprayed onto sand (media), and/or final filter device to remove the bacteria.

Although absorption of water soluble solvents is primarily described herein, the absorbent is not so limited. In some instances, the absorbent compound(s) described herein may be utilized for absorbing gaseous contaminants or contaminants in the air.

EXAMPLES

Example 1

An absorbent compound was made by first rinsing a film (and all other surfaces that came into contact with the absorbent compound) with distilled water. Next, 7.9 grams of a lightly cross-linked alkali-swellable acrylic emulsion polymer (e.g. Carbopol® Aqua 30) and 8.1 grams of a lauramine oxide (e.g. Barlox™ 12) were blended for no more than five minutes. After about 10 seconds of blending about 70% of the water in each component (e.g. Barlox 12 and Carbopol Aqua 30) may be removed from the resulting absorbent compound. The film was then rinsed with distilled water, before the absorbent compound is moved to it. The resulting absorbent compound was then dried into a gel consistency. The resulting absorbent gel may have a variety of uses, some of which are discussed in the Examples 2-5 that follow.

Example 2

The effectiveness of the absorbent of Example 1 was evaluated with respect to RIT cherry red dye. The starting solution was generated by blending 0.29 g of RIT cherry red liquid dye with five (5) ounces of distilled water. The LUX of this starting solution or control was 205. Ten grams of this control solution was placed into a first 16×150 mm test tube, and 10 grams of this solution was also placed into a second 16×150 mm test tube with 0.50 grams of the absorbent of Example 1. Both test tubes were placed on a test tube rocker, and Lux reading were taken every hour. The results of these readings are presented in FIG. 1, where a first line 110 represents the Lux readings from the control and a second line 120 represents the Lux readings from the Example 1 absorbent. The Lux readings for 12 hours are also presented in Table 2 below.

TABLE 2

|  | 0 h | 1 h | 2 h | 3 h | 4 h | 5 h | 6 h | 7 h | 8 h | 9 h | 10 h | 11 h | 12 h |
| --- | --- | --- | --- | --- | --- | --- | --- | --- | --- | --- | --- | --- | --- |
| Distilled Water Control | 560 | 560 | 560 | 560 | 560 | 560 | 560 | 560 | 560 | 560 | 560 | 560 | 560 |
| RIT Dye Control | 205 | 205 | 205 | 205 | 207 | 209 | 207 | 209 | 208 | 209 | 209 | 209 | 209 |
| Ex. 1 Absorbent | 205 | 333 | 348 | 350 | 372 | 432 | 448 | 516 | 530 | 540 | 542 | 564 | 575 |

As illustrated in FIG. 1 and Table 2, the absorbent of Example 1 was able to absorb the fabric dye and remove the dye molecules from the distilled water. The test sample had a final LUX reading of 575, while distilled water has a LUX reading of 560; this indicates the absorbent of Example 1 purified the sample more than distilled water. It is worthy of note that conventionally dyes are filtered, and what cannot be filtered is bleached, which removes the color from the dye molecule, not the dye molecule itself. In the instant example, the dye molecule itself is absorbed.

Example 3

The effectiveness of the absorbent of Example 1 was evaluated with respect to bacterial content of river water. Eight (8) ounces of Ohio River water was placed into each of two beakers: (1) a control beaker and (2) a test beaker. The test beaker also contained the absorbent of Example 1. The Example 1 absorbent was allowed to float on top of the water for 24 hours. Total aerobic bacteria counts were obtained using the Hach® water quality analysis. The results of this analysis are presented in Table 3 below.

TABLE 3

|  | Bacteria Count at Start (0 h) | Bacteria Count at End 24 h) |
| --- | --- | --- |
| Control | >3 million | >3 million |
| Example 1 Absorbent | >3 million | 1-5 |

As illustrated in Table 3, the absorbent of Example 1 absorbed substantially all bacteria from the river water sample.

Example 4

The effectiveness of the absorbent of Example 1 was evaluated with respect to the water soluble solvent Dowanol PM. Dowanol PM is known to be a difficult solvent to remove from water. This test is meant to emulate the effectiveness of the Example 1 absorbent in absorbing a solvent that may be released into a natural water source (e.g. a creek, pond, waste stream, or the like). A starting solution was generated by blending 1.00 g of Dowanol PM liquid solvent with 100 g of distilled water. The refractive index of the starting solution (control) was 1.3344. Ten grams of this control solution was placed into a first 16×150 mm test tube, and 10 grams of this solution was also placed into a second 16×150 mm test tube with 0.50 grams of the absorbent of Example 1. Both test tubes were placed on a test tube rocker, and a refractive index measurement was taken every fifteen minutes for one hour. The results of these readings are presented in FIG. 2, where a first line 210 represents the refractive index readings from the control and a second line 220 represents the refractive index readings from the Example 1 absorbent. The results after one hour are also presented in Table 4 below.

TABLE 4

|  | Refractive Index at Start (0 h) | Refractive Index at (15 m) | Refractive Index at (30 m) | Refractive Index at (45 m) | Refractive Index at End (1 h) |
| --- | --- | --- | --- | --- | --- |
| Distilled Water Control | 1.3330 | 1.3330 | 1.3330 | 1.3330 | 1.3330 |
| Dowanol Control | 1.3344 | 1.3344 | 1.3344 | 1.3344 | 1.3344 |
| Example 1 Absorbent | 1.3344 | 1.3334 | 1.3332 | 1.3331 | 1.3330 |

Figure 2:
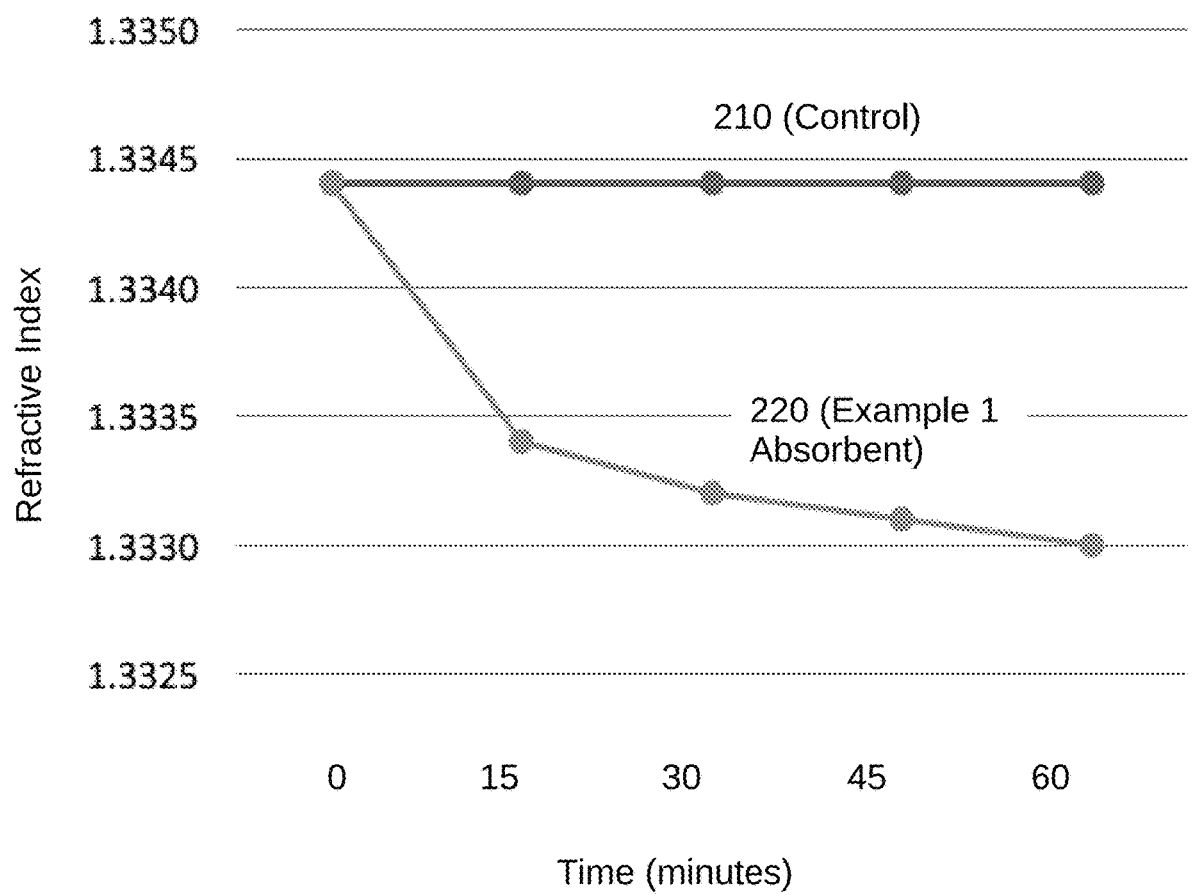
FIG. 2 is a graph illustrating the effect of the absorbent of Example 1 on Dowanol PM as described in Example 4.

As illustrated in FIG. 2 and Table 4, the absorbent of Example 1 was able to adsorb and absorb the dissolved solvent without distillation, biodegradation, or other time consuming and costly methods.

Example 5

The effectiveness of the absorbent of Example 1 was evaluated with respect to removing contaminants of acid mine drainage. Specifically, the effectiveness of the Example 1 absorbent with respect to aluminum, manganese, and iron solids in the Wildcat Branch Acid Mine Drainage was examined. Furthermore, the effect of the Example 1 absorbent on pH and conductivity was also examined.

Figure 3A:
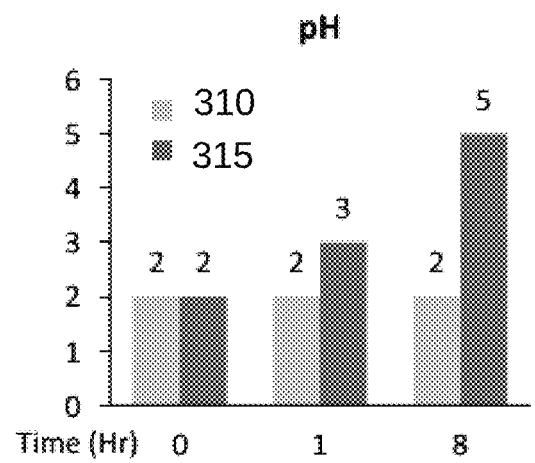
FIGS. 3A-E are graphs illustrating the effect of the absorbent of Example 1 on acid mine drainage as described in Example 5. Specifically.

For the pH measurement, the control sample from Wildcat Branch acid mine drainage was analyzed using a pH test strip at time point zero, after one hour, and after eight hours. As illustrated in Table 5, the control sample 305 pH was 2 at all three time points (0, 1, and 8 hours). The test sample 310, which contained 17.67 grams of acid mine drainage and 0.56 grams of the absorbent from Example 1, was also tested using pH strips at time point zero, after one hour, and after eight hours. The results of this testing are presented below in Table 5, as well as in FIG. 3A.

TABLE 5

|  | pH at 0 h | pH at 1 h | pH at 8 h |
| --- | --- | --- | --- |
| Acid Mine Drainage Control | 2 | 2 | 2 |
| Example 1 Absorbent Test | 2 | 3 | 5 |

Figure 3B:
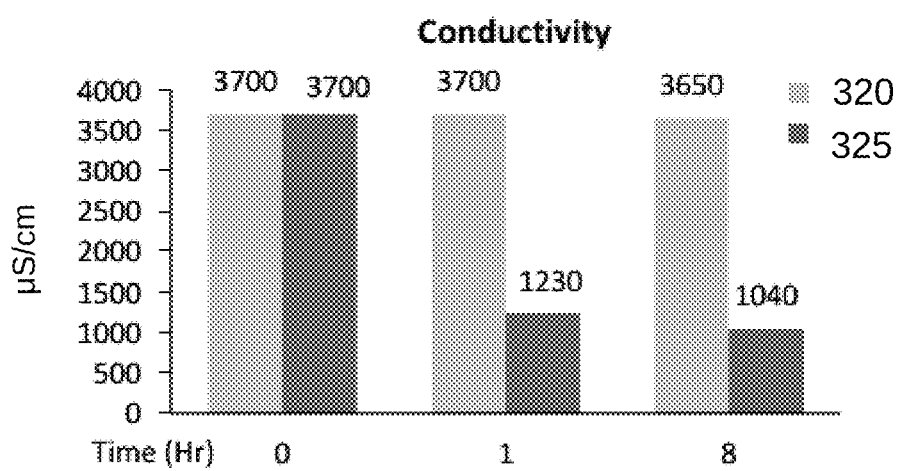

For the conductivity measurement, a conductivity meter read the control sample 315 for 10 seconds at 37000/cm, a total conductivity measurement would be equal to 37000/cm. The treated sample 320, which contained 17.67 grams of acid mine drainage and 0.56 grams of the absorbent from Example 1, was tested at time point zero, after one hour, and after eight hours. The results of this testing are presented below in Table 6, as well as in FIG. 3B.

TABLE 6

|  | Conductivity at 0 h | Conductivity at 1 h | Conductivity at 8 h |
| --- | --- | --- | --- |
| Acid Mine Drainage Control | 3700 | 3700 | 3650 |
| Example 1 Absorbent Test | 3700 | 1230 | 1040 |

Figure 3C:
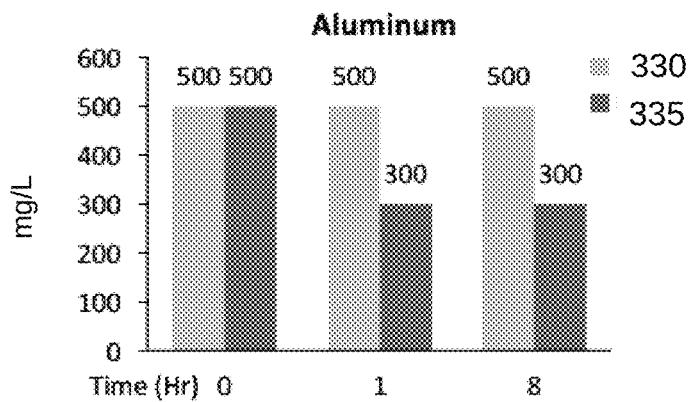

For measuring the aluminum content an aluminum rapid test strip was used (Macherey-Nagel, Catalog No. 913-07). One drop of potassium hydroxide was added to 1 ml of the control sample 325 and stirred. This control sample/potassium hydroxide combination was applied to the aluminum test trip for one second and the excess liquid was shaken off. One drop of the acetic acid was added to the test strip and the test trip was placed into a vessel, where the test strip was allowed to soak for 60 seconds to 120 seconds. The resulting test strip was then compared to the color scale provided by the manufacture. The control test strip was a dark purple, which indicates about 500 mg/L of aluminum in the control sample 325. It should be noted that the maximum on the manufacturer provided scale was 500 mg/L, so it is possible the control sample exceeded 500 mg/L aluminum. The treated sample 330, which contained 17.67 grams of acid mine drainage and 0.56 grams of the absorbent from Example 1, was tested using the same method described with respect to the control sample. The aluminum concentration was measured in both the control sample 325 and the test sample 330 with the Example 1 absorbent at time point zero, after one hour, and after eight hours. The results of this testing are presented below in Table 7, as well as in FIG. 3C.

TABLE 7

|  | mg/L Al at 0 h | mg/L Al at 1 h | mg/L Al at 8 h |
| --- | --- | --- | --- |
| Acid Mine Drainage Control | 500 | 500 | 500 |
| Example 1 Absorbent Test | 500 | 200-300 | 200-300 |

Figure 3D:
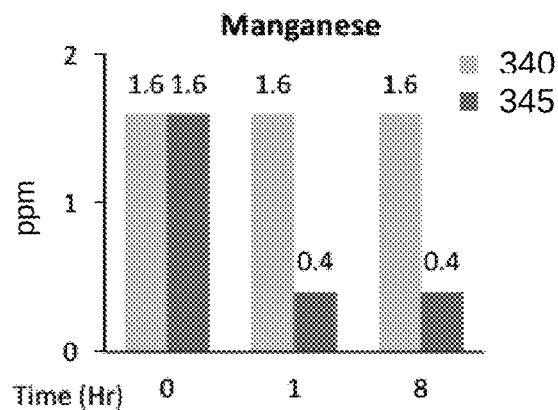

For measuring the manganese content a manganese rapid test strip was used (SenSafe®, Catalog No. 481020). The first test strip from the kit was dipped into 1 ml of the control sample and gently moved back of forth for 20 seconds. The second test strip from the kit, which contains 40 mg of cyanide, is then dipped into the control sample and moved gently moved back and forth for 20 seconds. The third test strip is then dipped into the control sample and moved gently back and forth, removed from the liquid, and the excess liquid shaken off. After three minutes, this third test strip was then compared to the color scale provided by the manufacture. The control test strip was a dark purple, which indicates about 1.6 ppm of manganese. It should be noted that the maximum on the manufacturer provided scale was 1.6 ppm, so it is possible the control sample exceeded 1.6 ppm manganese. The treated sample 340, which contained 17.67 grams of acid mine drainage and 0.56 grams of the absorbent from Example 1, was tested using the same method described with respect to the control sample. The manganese concentration was measured in both the control sample 335 and the test sample 340 with the Example 1 absorbent at time point zero, after one hour, and after eight hours. The results of this testing are presented below in Table 8, as well as in FIG. 3D.

TABLE 8

|  | ppm Mn at 0 h | ppm Mn at 1 h | ppm Mn at 8 h |
| --- | --- | --- | --- |
| Acid Mine Drainage Control | 1.6 | 1.6 | 1.6 |
| Example 1 Absorbent Test | 1.6 | 0.4 | 0.4 |

Figure 3E:
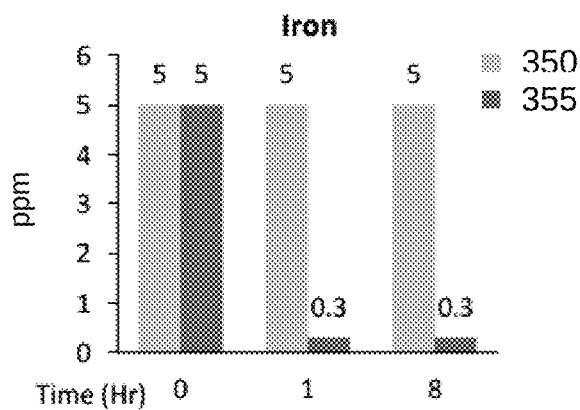

For measuring the iron content an iron rapid test strip was used (SenSafe® Iron Check, Catalog No. 480125). The test strip from the kit was dipped into 1 ml of the control sample 345 and gently moved back of forth for 30 seconds. The test step is then removed, and the excess liquid shaken off. After two minutes, this test strip was then viewed through an aperture of the color chart to match with a color with the chart provided by the manufacturer. The control sample was a dark blue color, which corresponded to 5.0 ppm on the color scale. The treated sample 350, which contained 17.67 grams of acid mine drainage and 0.56 grams of the absorbent from Example 1, was tested using the same method described with respect to the control sample. The iron concentration was measured in both the control sample 345 and the test sample 350 with the Example 1 absorbent at time point zero, after one hour, and after eight hours. The results of this testing are presented below in Table 9, as well as in FIG. 3E.

TABLE 9

|  | ppm Fe at 0 h | ppm Fe at 1 h | ppm Fe at 8 h |
| --- | --- | --- | --- |
| Acid Mine Drainage Control | 5.0 | 5.0 | 5.0 |
| Example 1 Absorbent Test | 5.0 | 0.3 | 0.3 |

The absorbent of Example 1 was not rinsed prior to testing, which is why once the treatment was applied to acid mine drainage, it appeared that the solids (e.g. the metals) in the acid mine drainage may react and fall to the bottom of the test tube (e.g. gravity precipitation) as a brown precipitate. It was observed that this precipitation occurs within the first hour of introducing treatment to the acid mine drainage. When testing was completed, the treatment absorbs 95% of the solids in the acid mine drainage. If the absorbent of Example 1 were to have been rinsed the absorbent may absorb about 99% to about 100% of the acid mine drainage.

Example 6

An absorbent compound was made by placing 8.0 grams of a lightly cross-linked alkali-swellable acrylic emulsion polymer (e.g. Carbopol® Aqua 30) in a first container and 8.0 g of a lauramine oxide (e.g. Ammonyx® LO) in a second container. A first piece of non-woven fabric (5.9 mm by 5.9 mm by 1 mm) was used to absorb the lauramine oxide (e.g. Ammonyx® LO) by dipping the first piece of non-woven fabric into the second container, while a second piece of non-woven fabric (5.9 mm by 5.9 mm by 1 mm) was used to absorb the lightly cross-linked alkali-swellable acrylic emulsion polymer (e.g. Carbopol® Aqua 30) by dipping the second piece of non-woven fabric into the first container. Each non-woven fabric was a dryer sheet made of recycled polypropylene. A release liner was placed on a flat surface, and the first piece of non-woven fabric containing the lauramine oxide (e.g. Ammonyx® LO) was placed onto the release liner. The second piece of non-woven fabric was used to absorb the lightly cross-linked alkali-swellable acrylic emulsion polymer (e.g. Carbopol® Aqua 30) was placed on top of the first piece of non-woven fabric. The first and second pieces of non-woven fabric were then agitated until the combination turned white. A fan was placed above the combination, and the combination was allowed to dry for one (1) hour. Finally, the solution was rinsed with distilled water. The application of the absorbent to a non-woven fabric, as described in this Example, allows for an increased surface area for the absorbent. The resulting absorbent may have a variety of uses, some of which are discussed in the Examples 7-10 that follow. In particular, the resulting absorbent was evaluated with respect to water soluble solvents, which may emulate the effectiveness of the Example 6 absorbent in absorbing a solvent that may be released into a natural water source (e.g. a creek, pond, stream, or the like), a waste stream, or during the treatment of potable water (e.g. tap water).

Example 7

The effectiveness of the absorbent of Example 6 was evaluated with respect to the water soluble organic solvent N-Methyl-2-pyrrolidone (NMP). A starting solution was generated by blending 2.00 g of NMP liquid solvent with 100 g of distilled water. The refractive index of the starting solution (control) was 1.3345. Ten grams of the starting solution was placed in a first "control" test tube. Ten grams of the starting solution along with 0.50 grams of the absorbent of Example 6 was placed in a second "test sample" test tube. Both test tubes were placed on a test tube rocker, and a refractive index measurement was taken at time point zero, after one hour, and after four hours. The results of these readings are presented in Table 10 below.

TABLE 10

| | Refractive Index at Start (0 h) | Refractive Index at 1 h | Refractive Index at 4 h |
| --- | --- | --- | --- |
| Distilled Water Control | 1.3330 | 1.3330 | 1.3330 |
| NMP Control | 1.3345 | 1.3345 | 1.3345 |
| Example 6 Absorbent | 1.3345 | 1.3340 | 1.3340 |

In addition to measuring the refractive index, the size and weight of the non-woven fabric was measured before and after the absorbent was tested. Prior to testing the non-woven fabric with the absorbent of Example 6 measured 5.5 mm long, 6.5 mm wide, and 1.0 mm thick and weighed 0.68 grams (0.5 of absorbent and 0.9 for each non-woven fabric sheet). After 4 h of treatment, the non-woven fabric measured 6.5 mm long, 6.5 mm wide, and 1.0 mm thick and weighed 0.72 grams. This indicates the absorbent of Example 6 was able to absorb a substantial portion of the NMP.

Example 8

The effectiveness of the absorbent of Example 6 was evaluated with respect to the water soluble solvent isopropanol 91%. A starting solution was generated by blending 2.00 g of isopropanol 91% with 100 g of distilled water. The refractive index of the starting solution (control) was 1.3340. Ten grams of the starting solution was placed in a first "control" test tube. Ten grams of the starting solution along with 0.50 grams of the absorbent of Example 6 was placed in a second "test sample" test tube. Both test tubes were placed on a test tube rocker, and a refractive index measurement was taken at time point zero, after one hour, and after four hours. The results of these readings are presented in Table 11 below.

TABLE 11

| | Refractive Index at Start (0 h) | Refractive Index at 1 h | Refractive Index at 4 h |
| --- | --- | --- | --- |
| Distilled Water Control | 1.3330 | 1.3330 | 1.3330 |
| Isopropanol 91% Control | 1.3340 | 1.3340 | 1.3340 |
| Example 6 Absorbent | 1.3340 | 1.3335 | 1.3331 |

In addition to measuring the refractive index, the size and weight of the non-woven fabric was measured before and after the absorbent was tested. Prior to testing the non-woven fabric with the absorbent of Example 6 measured 7.0 mm long, 6.0 mm wide, and 1.0 mm thick and weighed 0.68 grams (0.5 of absorbent and 0.9 for each non-woven fabric sheet). After 4 h of treatment, the non-woven fabric measured 7.2 mm long, 6.0 mm wide, and 1.0 mm thick and weighed 0.95 grams. This indicates the absorbent of Example 6 was able to absorb a substantial portion of the isopropanol 91%.

Isopropanol 91% is one of three major solvents in the electronics or semiconductor industry. As illustrated above, the absorbent of Example 6 effectively adsorbs and absorbs isopropanol 91%.

Example 9

The effectiveness of the absorbent of Example 6 was evaluated with respect to the water soluble solvent Dowanol PM. A starting solution was generated by blending 1.00 g of Dowanol PM liquid solvent with 100 g of distilled water. The refractive index (RI) of the starting solution (control) was 1.3344. A test solution was similarly generated by blending 2.00 g of isopropanol 91% solvent, 100 g of distilled water, and 0.50 grams of the absorbent of Example 6. Both test tubes were placed on a test tube rocker, and a refractive index measurement was taken every fifteen minutes for one hour. The results are presented in Table 12 below.

TABLE 12

| | RI at 0 h | RI at 15 m | RI at 30 m | RI at 45 m | RI at 1 h |
| --- | --- | --- | --- | --- | --- |
| Distilled Water Control | 1.3330 | 1.3330 | 1.3330 | 1.3330 | 1.3330 |
| Dowanol Control | 1.3344 | 1.3344 | 1.3344 | 1.3344 | 1.3344 |
| Example 6 Absorbent | 1.3344 | 1.3334 | 1.3332 | 1.3331 | 1.3330 |

Example 10

The effectiveness of the absorbent of Example 6 was evaluated with respect to the water soluble solvent acetone. A starting solution was generated by blending 2.00 g of acetone liquid solvent with 100 g of distilled water. The refractive index of the starting solution (control) was 1.3340. Ten grams of the starting solution was placed in a first "control" test tube. Ten grams of the starting solution along with 0.50 grams of the absorbent of Example 6 was placed in a second "test sample" test tube. Both test tubes were placed on a test tube rocker, and a refractive index measurement was taken at time point zero, after one hour, and after four hours. The results of these readings are presented in Table 13 below.

TABLE 11

| | Refractive Index at Start (0 h) | Refractive Index at 1 h | Refractive Index at 4 h |
| --- | --- | --- | --- |
| Distilled Water Control | 1.3330 | 1.3330 | 1.3330 |
| Acetone Control | 1.3340 | 1.3340 | 1.3340 |
| Example 6 Absorbent | 1.3340 | 1.3335 | 1.3331 |

In addition to measuring the refractive index, the size and weight of the non-woven fabric was measured before and after the absorbent was tested. Prior to testing the non-woven fabric with the absorbent of Example 6 measured 7.0 mm long, 6.0 mm wide, and 1.0 mm thick and weighed 0.68 grams (0.5 of absorbent and 0.9 for each non-woven fabric sheet). After 4 h of treatment, the non-woven fabric measured 7.8 mm long, 6.0 mm wide, and 1 mm thick and weighed 1.00 grams. This indicates the absorbent of Example 6 was able to absorb a substantial portion of the acetone.

Acetone is one of three major solvents in the electronics or semiconductor industry. As illustrated above, the absorbent of Example 6 effectively adsorbs and absorbs acetone.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. An absorbent compound comprising:
   an amine oxide including at least a lauramine oxide comprising about 30% to about 55% of the absorbent compound; and
   a polymer including at least a lightly cross-linked alkali-swellable acrylic emulsion polymer comprising about 30% to about 55% of the absorbent compound;
   wherein the absorbent compound is disposed on a film substrate.

2. The absorbent compound of claim 1, wherein the amine oxide comprises about 50% to about 52% of the absorbent compound and the polymer comprises about 48% to about 50% of the absorbent compound.

3. The absorbent compound of claim 1, further comprising a preservative comprising about 0.01% to about 1.0% of the absorbent compound.

4. The absorbent compound of claim 3, wherein the preservative is urea.

5. The absorbent compound of claim 1, wherein the film substrate is a filter, a film, or incorporated as part of a housing for a filter.

6. The absorbent compound of claim 1, wherein the absorbent compound is configured to adsorb and absorb an organic from a water source.

7. The absorbent compound of claim 6, wherein the organic is a water soluble solvent.

8. The absorbent compound of claim 1, wherein the absorbent compound is configured to absorb a contaminant from a gas or atmospheric air.

* * * * *